Aug. 4, 1936.  E. O. COREY  2,050,207
WATER GAUGE
Filed Aug. 28, 1935
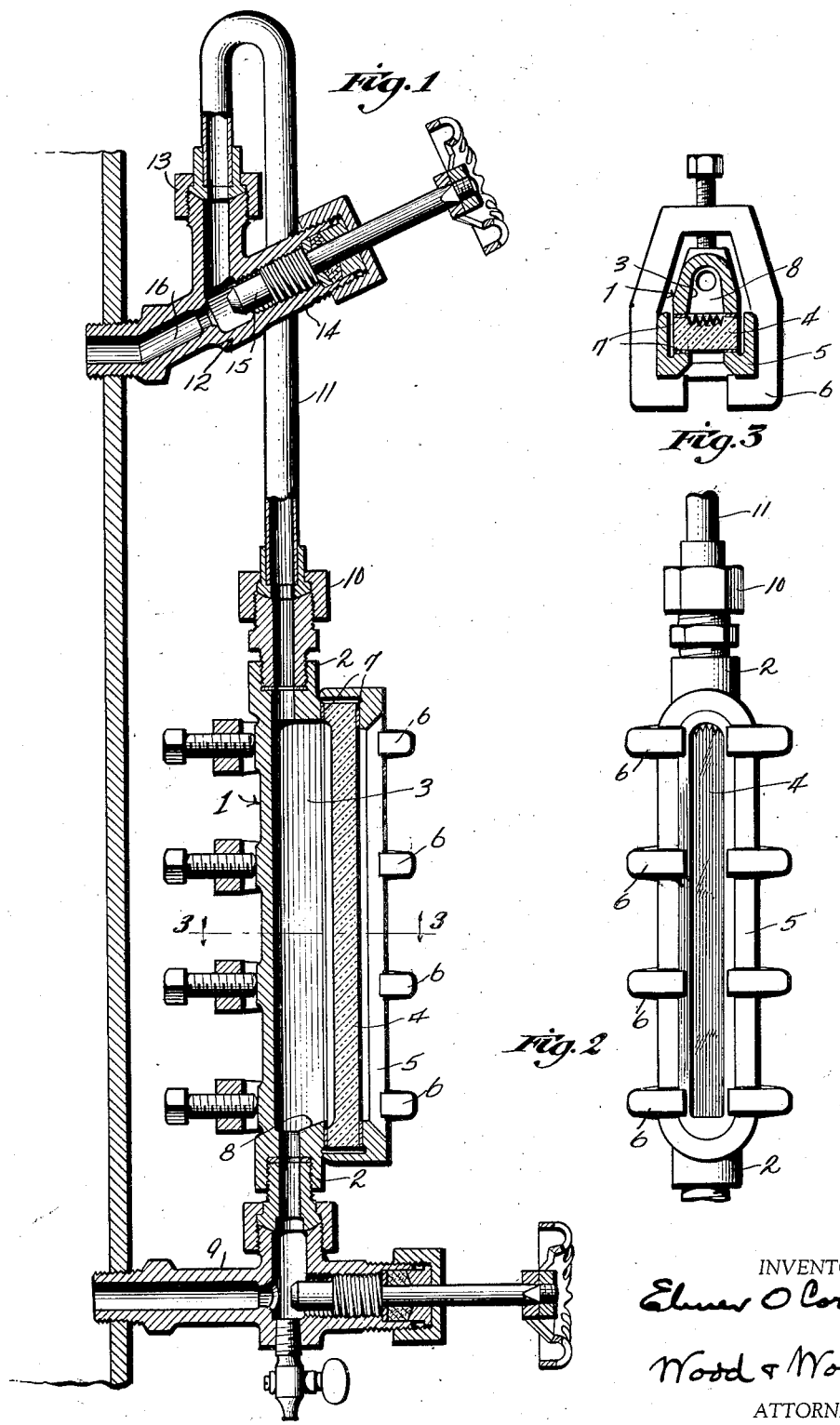
INVENTOR.
Elmer O Corey
Wood & Wood
ATTORNEYS Patented Aug. 4, 1936

2,050,207

UNITED STATES PATENT OFFICE 2,050,207

WATER GAUGE

Elmer O. Corey, Norwood, Ohio, assignor to The Edna Brass Manufacturing Company, Cincinnati, Ohio, a corporation of Ohio Application August 28, 1935, Serial No. 38,239

1 Claim. (Cl. 73—54)

This invention relates to an improvement in water gauges of the reflex type for use on steam boilers, locomotive and stationary. The reflex type of water gauge for boilers has a heavy plate glass covering, a longitudinal opening in the body of the gauge, the glass being surrounded and supported by a frame securely clamped at several points to the body. This type of gauge is meeting increased demand on boilers carrying high steam pressure because of its high safety qualities. The rear or inner side of the glass plate within its margins is longitudinally cut or cast with the grooves to provide reflective surfaces. In order to provide a flat marginal face surface for the inner side of the glass to seat against a corresponding surface on the gauge body for making a pressure-tight joint, it is necessary to form the terminals of the grooves within the margins of the inner face of the plate. The terminals of the grooves in the lens, together with the adjacent wall surfaces forming the opposite ends of the channel in the body which the lens covers in gauges, as heretofore constructed, result in producing shadows or light reflections which are apt to be misread for water, and any deception to the visibility of the actual height or level of the water column is very objectionable, particularly at a low water point.

An object of the invention is to provide a water gauge of the reflex type with structural advantages overcoming deception to reading or vision of the height of the water column as heretofore encountered.

Another object of the invention is to connect the upper end of a water gauge with a non-water-trapping neck and angle cock, the angle cock being located below the neck and connecting with the boiler in a position inclined upwardly from the horizontal line which otherwise has been experienced to inaccurately register water levels.

Various other features of the invention will be more fully set forth in the description of the accompanying drawing, in which:

Figure 1 is a central vertical section through the gauge and insulation connections and in position as applied to a boiler.

Figure 2 is a front elevation of the gauge.

Figure 3 is a section on line 3—3, Fig. 1.

Referring to the drawing, 1 indicates the body of the gauge formed with internally screw-threaded hubs 2, 2, one at each of its opposite longitudinal ends to which the necessary fittings are attached for connecting the gauge appropriately to a boiler. The body internally and intermediate of its hub ends has a longitudinal channel 3 opened to one or front side of the casing or body 1, for a water column sight space for making the boiler water level reading.

The front side of the body about the channel is formed to provide a flat or plane surfaced rim 5 for seating a glass plate 4 as a transparent closure for the channel. The glass plate 4 is surrounded and supported by a flanged frame 5 and the glass and frame are clamped to the body by a plurality of screw-tightened yoke clamps 6 which straddle the body and grasp the opposite longitudinal margins of the frame following a method commonly employed in this type of gauge.

Packing material or gaskets 7, 7, are interposed between the opposing engaging surfaces of the glass and body, and the glass and frame to make a pressure-tight joint. The inner or rear side of the glass 4 and within its margins is longitudinally grooved preferably with V-grooves to provide reflecting surfaces. The terminals of the grooves are within the margins of the opposite ends of the glass and it is usual to provide five grooves with the intermediate grooves the longer of the series.

The relative different lengths of the grooves offset the terminals of adjoining grooves, this being necessitated owing to the curved configuration for the opposite longitudinal ends of the glass and this with the formation of the groove terminal has a tendency to throw a shadow which in conjunction with the visibility of the end wall of the channel and a pocketing or trapping of water between the glass and surface of the end wall indicating a false water level, deceptive to the observer, particularly after the water level of the column in the channel has fallen below a point of vision.

In all former constructions the walls in the body at the opposite longitudinal ends of the channel and particularly for the lower end wall from the front seat face inclined upwardly toward the rear, rendering the wall surface visible through the glass and also forming a trap for collecting water at the rear side of the glass and this with the reflex features of the glass cause a shadow more or less intensified by the wall structure making clear, defined lines, indication of a false level when the water column descended therebelow.

In the present construction of body and particularly for the lower end wall 8 the wall directly from the gasket seat or front rim face is inclined downwardly recessing the end wall surface below the window line of the frame, and the inclination is of a degree to practically make the wall invisible through the gauge glass and avoiding any water trapping, so that there is no occasion to cause the lower reflex part of the glass to reflect the water trapped in rear thereof. In the general construction of reflex gauges for permitted trapping of water between the lower end wall surface and glass it is practically impossible to observe whether the water column has actually dropped below the sight channel as the trapped water would be deceptive of a false water level when the actual level would be below such point. In the present construction when the water level falls below the end of the channel actual perception of low water conditions is clearly had but no opportunity for presenting false water lines or deceptive indications.

The lower end of the gauge is connected to a boiler by an angle cock 9 having a union connection with the lower hub of the gauge body. The bottom cock 9 has straight passageways following the general practice. The upper end of the gauge connects by means of a union fitting 10 with a vertically extended goose neck or return bend tube 11 carrying a taut angle cock 12 connected by means of a union fitting 13 to the tube below the bend.

The top gauge cock is constructed with a one-piece body 14 presenting the valve 15 and inlet passage 16 controlled by the valve at an angle to a horizontal line with the valves attached to the bar. The inclination is upward for the top connection of the gauge with the boiler so as not to allow for any trapping of water within the valve or passage connecting the top end of the valve with the boiler, which if permitted would cause the water gauge to not register correct water level. Thus any condensation that may occur in the valve and tube at the off side of the bend will drain downwardly into the boiler so that the full capacity of the passage is constantly opened to the upper end of the gauge with the boiler when the valve is open and the necessary head or steam pressure delivered to the gauge.

Having described my invention, I claim:

A boiler water level gauge of the reflex type, comprising, a gauge body, internally providing a longitudinal water level sight channel, open to a face side of the body, the body having a plain surfaced margin for the configuration of the open side of said channel for setting a glass plate lens and channel closure thereagainst, a glass plate lens providing a closure for said channel opening, a flanged frame marginally enclosing and opening said lens, clamping means for securing said frame and lens as a unit to the body under a pressure tight union, said body having an internal wall forming the lower extremity of said longitudinal channel, said wall being inclined downwardly toward the rear side of the channel to obscure the same from a line of vision through the frame and lens at the lower end thereof, and provide a non-water trapping surface between the mouth of the channel and inside surface of the lens.

ELMER O. COREY.